US006020726A

United States Patent [19]
James

[11] Patent Number: 6,020,726
[45] Date of Patent: Feb. 1, 2000

[54] AC VOLTAGE REGULATOR

[75] Inventor: Mark S. James, Mission Viejo, Calif.

[73] Assignee: U.S.Energy, Inc., San Clemente, Calif.

[21] Appl. No.: 09/103,423

[22] Filed: Jun. 24, 1998

[51] Int. Cl.[7] .......... G05F 1/10
[52] U.S. Cl. .......... 323/239; 323/259; 323/344
[58] Field of Search .......... 323/239, 259, 323/263, 344; 363/101, 90

[56] References Cited

U.S. PATENT DOCUMENTS

| | | | |
|---|---|---|---|
| 4,429,269 | 1/1984 | Brown | 323/301 |
| 4,716,357 | 12/1987 | Cooper | 323/263 |
| 4,745,352 | 5/1988 | McGuire | 323/263 |
| 5,545,971 | 8/1996 | Gomez et al. | 323/259 |

*Primary Examiner*—Adolf Deneke Berhane
*Attorney, Agent, or Firm*—Stetina Brunda Garred & Brucker

[57] ABSTRACT

An AC voltage regulator provides a desired AC voltage to a load. The desired AC voltage is within a predetermined range above and below that of an AC voltage source. The AC voltage regulator has a transformer, the secondary winding of which is configured to be placed in series with the AC voltage source and the load. A plurality of switches is configured to direct current from the AC voltage source through the primary winding of the transformer. The switches are further configured to control the direction in which current flows through the primary winding of the transformer. A pulse width modulator controls the switches according to a desired cycle period.

20 Claims, 2 Drawing Sheets

AC VOLTAGE REGULATOR

FIELD OF THE INVENTION

The present invention relates generally to voltage regulators and more particularly to an AC voltage regulator for providing a desired AC voltage to a load, wherein the desired AC voltage is within a predetermined range, e.g., 10%, above and below that of an AC voltage source.

BACKGROUND OF THE INVENTION

Voltage regulator circuits are used in various designs of energy saving control systems which are capable of responding to the changing power demands of a load by providing different output voltages. Existing voltage regulator circuits use tapped isolation transformers or auto-transformers and solid-state switches. The number of taps and the voltage range between the taps determine the output voltage range and the resolution of voltage regulation. Thus, such contemporary voltage regulators do not provide continuous regulation (regulation at any desired voltage) within their output voltage range. Rather, only a few, discrete voltages are provided.

The output voltage range is typically specified as a window centered at the nominal line voltage. For example, a voltage regulator having a total range window of 20% (from −10% to +10%) with a resolution of 2% would require 10 taps and 10 solid-state AC switches.

The switching for each tap is usually done by connecting two symmetric Silicon Controlled Rectifiers (SCRs) in an anti-parallel configuration to act as an AC switch. When current is applied by the control system to the gates of a pair of SCRs, these SCRs conduct current to connect power to the selected tap. When the current is removed from the gates of the SCRs, the SCRs will continue to conduct until the anode current drops below the latching current threshold. This normally occurs, in a loaded system, when the line current crosses through zero.

One of the problems associated with this type of contemporary voltage regulator is that control systems are usually not sophisticated enough to make sure that a pair of SCRs are turned off before the next tap's SCRs are gated on. If two pairs of SCRs are on at the same time, the two adjacent taps will act like a low voltage winding of a step-down transformer, and a large current will flow through the SCRs, thus causing substantial damage. To prevent this from occurring, in many systems, there is a time delay between removing gate current from one pair of SCRs and applying a gate current to another pair of SCRs. However, as those skilled in the art will appreciate, this will cause a short power interruption to the load. Such power interruption can negatively affect a load which comprises sensitive electronic components or systems.

As such, it is desirable to provide an AC voltage regulator which it utilizes inexpensive components to provide an AC voltage at a desired level, which does not interrupt power to the load when the voltage level is changed, which utilizes components which are not required to have high currents conducted therethrough, and which provides a continuously variable voltage output within its operational range.

SUMMARY OF THE INVENTION

The present invention specifically addresses and elevates the above-mentioned deficiencies associated with the prior art. More particularly, the present invention comprises an AC voltage regulator for providing the desired AC voltage to a load. The desired AC voltage is within a predetermined range, e.g., 10%, above and below that of an AC voltage source.

The AC voltage regulator comprises a transformer having a primary winding and a secondary winding. The secondary winding is configured to be placed in series with the AC source and the load. That is, when in use, the secondary of the transformer is electrically connected between the voltage source and the load such that the load current passes therethrough.

A plurality of switches are configured to direct current from the AC voltage source through the primary winding of the transformer. The switches are further configured to control the direction in which current flows through the primary winding of the transformer.

A circuit for controlling the switches is configured such that current is caused to flow through the primary winding of the transformer in a manner which provides the desired AC voltage across the load. By varying the manner in which the switches are controlled, the voltage applied to the load can be varied. That is, by varying the manner in which the switches effect current flow through the primary winding of the transformer, the output voltage of the AC voltage regulator can be changed within its predetermined range.

As discussed in detail below, the predetermined range of the AC voltage regulator of the present invention is determined by the ratio of the number of turns in the primary winding of the transformer to the number of turns in the secondary winding thereof. Current flow through the primary winding of the transformer induces a voltage in the secondary winding thereof which, depending upon the direction of current flow through the primary winding at any instant, either boosts or bucks the voltage of the AC voltage source. When the voltage induced into the secondary winding of the transformer is in phase with the AC voltage of the AC voltage source, then the voltage provided by the secondary winding of the transformer boosts (increases) the voltage of the AC source. Conversely, when the voltage of the secondary winding of the transformer is 180° out of phase with the voltage of the AC voltage source, then the voltage provided by the secondary winding of the transformer bucks (reduces) the voltage of the AC source.

The voltage induced into the secondary winding of the transformer is dependant upon the current flow through the primary winding of the transformer, which is controlled by the switches, as discussed in detail below.

According to the preferred embodiment of the present invention, four switches are utilized to control current flow through the primary winding of the transformer. One pair of switches control current flow through the primary winding of the transformer in one direction and another pair of switches controls current flow through the primary winding of the transformer in the other direction thereof. Each pair of switches is configured such that both switches of the pair and the primary winding of the transformer are in series with the voltage source and the primary winding of the transformer is located between the two switches of the pair. Each configuration facilitates the controlled flow of current through the primary winding of the transformer and either desired direction thereof.

The switches preferably comprise either silicon control rectifiers, isolated gate bipolar transistors, gate turn-off thyristors, metal oxide semi-conductor field effect transistors, or metal oxide semi-conductor controlled thyristors. Those skilled in the art will appreciate that various other electronic devices are likewise suitable for effecting control of current flow through the primary winding of the transformer in the desired direction thereof.

According to the preferred embodiment of the present invention, the circuit for controlling the switches comprises a pulse width modulator. Those skilled in the art will appreciate that various other devices for defining a pulse of a given amplitude and duration or for otherwise controlling the switches are likewise suitable.

According to the preferred embodiment of the present invention, the circuit for controlling the switches comprises a pulse with modulator which is configured to cause a first pair of the switches to conduct while simultaneously causing a second pair of the switches not to conduct. Subsequently, the pulse with modulator causes the second pair of switches to conduct while simultaneously causing the first pair of switches not to conduct. In this manner, one pair of switches conducts alternately with respect to the other pair thereof. When either pair of switches is conducting, then the other pair is not conducting.

It is important to note that the AC voltage regulator of the present invention is configured such that both pairs of switches do not conduct simultaneously, since this would effectively short the source of voltage, thereby likely damaging the switches and interrupting the supply of current to the load. According to the preferred embodiment of the present invention, a predetermined, very short, interval of time is provided between the time when alternate pairs of switches conduct, during which neither pair of switches conduct. That is, an underlap or dead time as provided during which none of the switches conduct so as to insure that the two pairs of switches do not conduct simultaneously, and thereby short out the source voltage. According to the preferred embodiment of the present invention, the predetermined underlap is approximately 5% of the time interval which defines a cycle period, as discussed in detail below.

According to the present invention a cycle period is defined during which one pair of switches conducts for a portion thereof and then the other pair of switches conducts for the remaining portion of the cycle period. The first pair of switches may conduct anywhere from 0% of the predetermined time interval to approximately 100% (or preferably 100% less the underlap which, according to the preferred embodiment of the present invention, is equal to approximately 5% of the predetermined time interval, such that either pair of switches can only conduct for 95% of a cycle period. When the first pair of switches is conducting, then the second pair of switches is not conducting. Thus, for an underlap of 5% and a cycle period of 70%, the first pair of switches conducts for 70% of the predetermined time interval, an underlap of 5% of the cycle period occurs during which none of the switches conduct, then the second pair of switches conducts for 20% of the cycle period, and another underlap of 5% of the cycle period occurs and for a total of 100%. The underlap actually occurs twice during a cycle period.

The length of the predetermined time interval which defines a cycle period is much less than the period of the AC voltage source. According to the preferred embodiment of the present invention, each cycle period is less than approximately 0.0001 seconds (which corresponds to a frequency of 10,000 Hz), preferably approximately 0.00005 seconds (which corresponds to a frequency of 20,000 Hz).

According to the preferred embodiment of the present invention an integrator, such as an inductor, smooths current flow through the primary winding of the transformer, such that current flow through the primary winding of the transformer generally defines a sinusoidal waveform. Since the primary winding of the transformer itself defines an inductor, it is anticipated that in some instances an additional inductor may not be required.

Thus, according to the present invention, the switches generally tend to cause current flow through the primary winding of the transformer in both directions during a given predetermined time interval or period. This preferably happens approximately 20,000 times per second. These two current flows add algebraically, due to the inductance of the integrator or inductor, as well as the inductance of the primary winding of the transformer itself, so as to define a single current flow in a single direction through the primary winding of the transformers during the predetermined time interval. The current flow during each predetermined time interval defines, over time, a generally sinusoidal waveform. That is, the current flow during each predetermined time interval is such that it increases and decreases periodically and is generally sinusoidal in shape.

According to the preferred embodiment of the present invention, the ratio of turns of the primary winding of the transformer to turns of the secondary winding thereof is approximately 10 to 1, so as to provide voltage regulation from approximately 90% of the voltage of the AC voltage source to approximately 110% thereof. However, those skilled in the art will appreciate that various other winding ratios are likewise suitable and will provide voltage regulation within various other predetermined ranges above and below the voltage of the AC voltage source. For example, a transformer having a ratio of 20 to 1 would provide voltage regulation from approximately 95% of the voltage of the AC voltage source to approximately 105% thereof.

Thus, according to the present invention, a method for providing a desired AC voltage to a load, wherein the desired AC voltage is within a predetermined range above and below that of the AC voltage source comprises the steps of defining a cycle period having a period less than a period of the AC source, switching a voltage applied to a current integrator and a primary winding of a transformer to have a first polarity for a first portion of the cycle period and switching the voltage applied to the current integrator and the primary winding of the transformer to have a second polarity for a second portion of the period. The current integrator may optionally comprise the primary winding of the transformer itself.

The current integrator facilitates a generally sinusoidal current flow the primary winding of the transformer. The primary winding of the transformer induces a voltage into a secondary winding of the transformer. The induced voltage changes a voltage from the AC voltage source to a desired AC voltage which is proportional to the turns ratio of the transformer.

These, as well as other advantages of the present invention will be more apparent from the following description and drawings. It is understood that changes in the specific structure shown and described may be made within the scope of the claims without departing from the spirit of the invention.

BRIEF DESCRIPTION OF THE DRAWINGS

These, as well as other features of the present invention, will become more apparent upon reference to the drawings wherein.

DETAILED DESCRIPTION OF THE INVENTION

The detailed description set forth below in connection with the appended drawings is intended as a description of the presently preferred embodiment of the invention, and is not intended to represent the only form in which the invention may be constructed or utilized. The description sets forth the functions and the sequence of steps for constructing and operating the invention in connection with the illustrated embodiment. It is to be understood, however, that the same or equivalent functions may be accomplished by different embodiments that are also intended to be encompassed within the spirit and scope of the invention.

Figure 1:
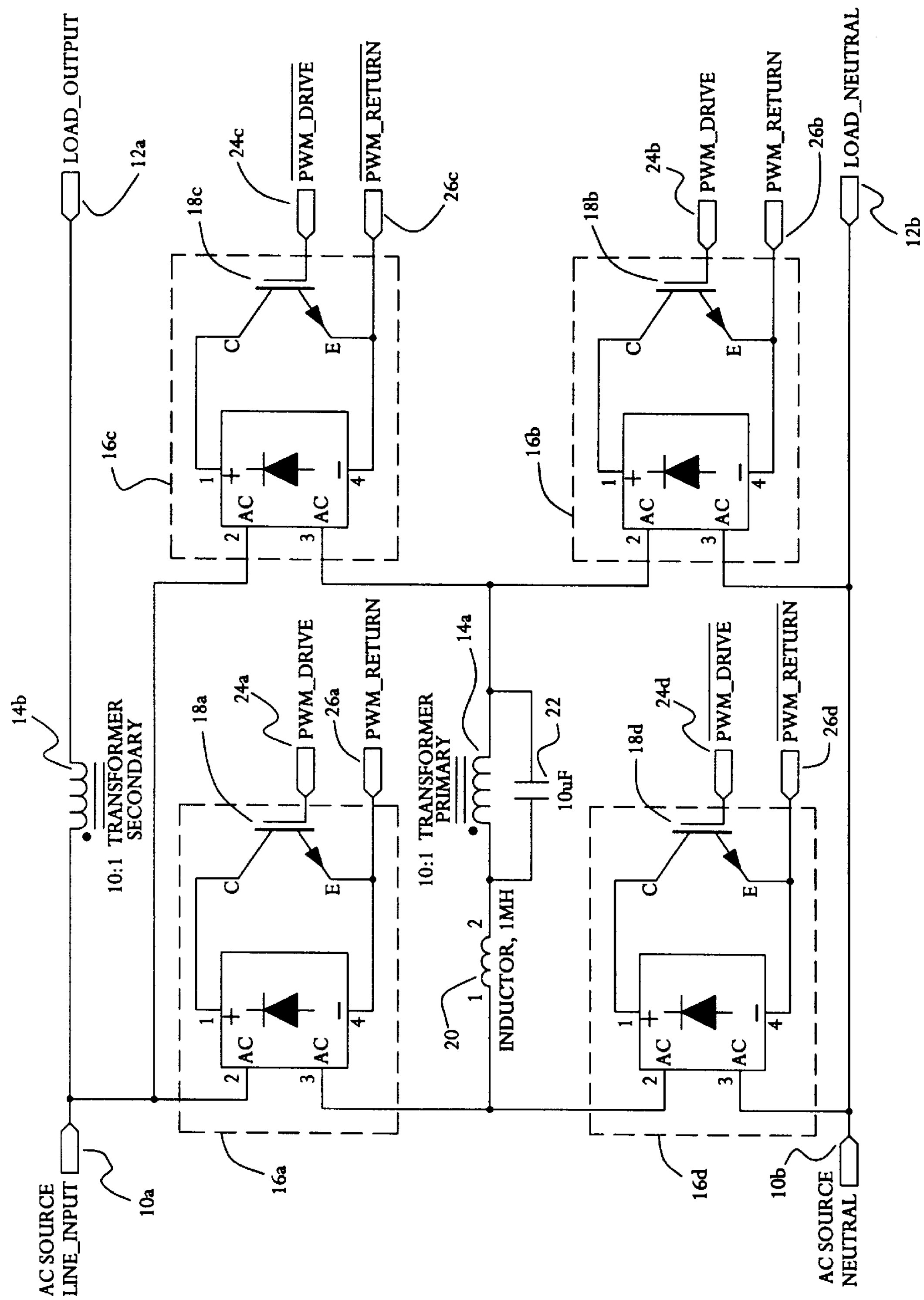
FIG. 1 is an electrical schematic showing the switches and transformer of the AC voltage regulator of the present invention.
Figure 2:
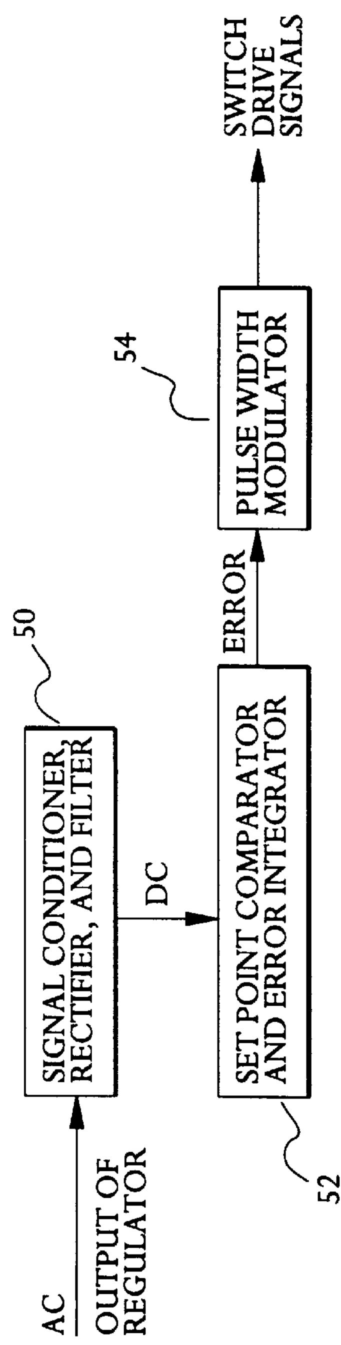
FIG. 2 is a block diagram showing the circuitry for controlling the switches of FIG. 1.
Figure 3:
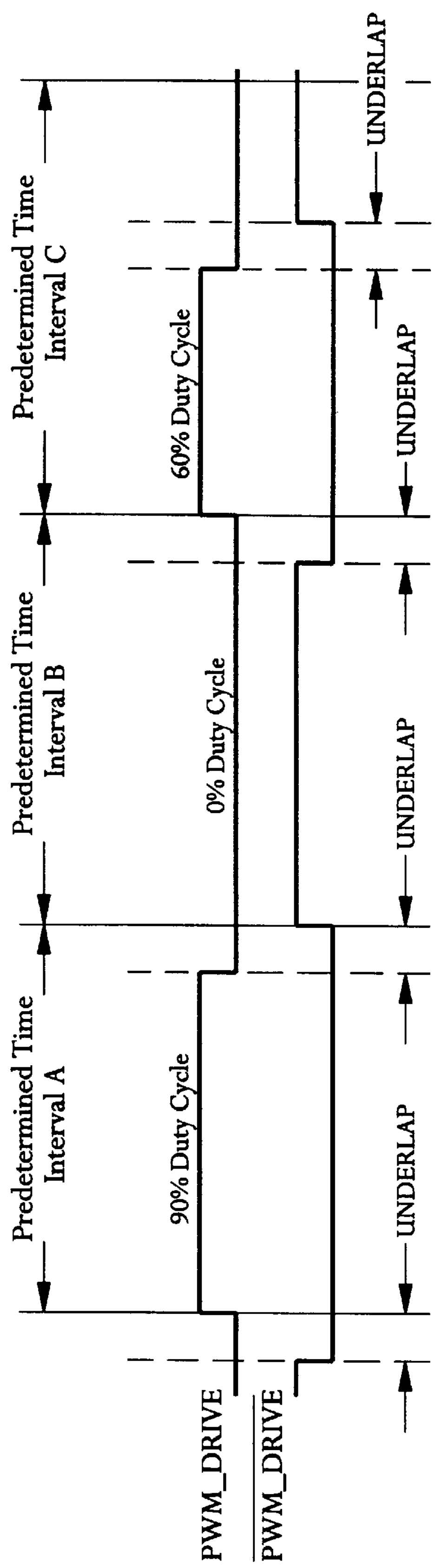
FIG. 3 is a timing diagram showing the PWM_DRIVE and its inverse signal, which are used to drive the diagonally opposed switches of FIG. 1, illustrating that the cycle period is defined by the percentage of time during which the PWM_DRIVE signal is present during a predetermined time interval and also showing the underlap wherein no switch is conductive for a short period of time before the next switch is caused to conduct.

The AC voltage regulator of the present invention is illustrated in FIGS. 1 through 3 which depict a presently preferred embodiment thereof. Referring now to FIG. 1, AC source line input 10*a* and AC source neutral 10*b* provide an AC voltage from an AC source such as a single phase breaker, a step down power transformer, a wall outlet, or any other desired source of AC voltage.

The schematic of FIG. 1 shows the regulation of a single phase of AC power. Those skilled in the art will appreciate that the present invention is likewise applicable to three phase power by regulating the voltage of each phase independently, with a separate circuit like that shown in FIG. 1. A common pulse width modulator circuit may be used to control all three switching circuits.

The load output 12*a* and load neutral 12*b* provide regulated AC voltage to a desired load, such as a motor, a lighting system, or any other desired load.

A 10 to 1step down transformer has a primary winding 14*a* having ten times as many turns as the secondary winding 14*b* thereof. The primary winding 14*a* of the transformer is connected to switch assembly 16*a*, 16*b*, 16*c*, and 16*d* in a manner which allows assemblies 16*a*, 16*b*, 16*c*, and 16*d* to control current flow therethrough. Switch assemblies 16*a*, 16*b*, 16*c*, and 16*d* control the amplitude of current through the primary winding 14*a* of the transformer, as well as a direction of current therethrough.

The secondary winding 14*b* of the transformer is in series with the AC source line input 10*a* and the load output 12*a* such that any voltage induced into the secondary binding 14*b* of the transformer may either boost or buck the voltage provided at that instant in time by the AC source. Thus, the secondary winding 14*b* of the transformer is capable of raising or lowering the voltage available at the load output 12*a* and load neutral 12*b* to which the load is connected.

The maximum amount by which the AC source voltage may be varied by the secondary winding 14*b* of the transformer depends upon the ratio of the number of turns of the primary winding 14*a* to the number of turns of the secondary winding 14*b* of the transformer. The lower this ratio, the greater the ability of the secondary winding 14*b* of the transformer to vary the voltage provided to the load.

For example, a 10 to 1 transformer facilitates a variation of 10% above or below the source voltage, whereas a 5 to 1 transformer facilitates a variation of 20% above and below the source voltage.

The switch assemblies 16*a*, 16*b*, 16*c*, and 16*d* comprise switches which are capable of bi-directional current flow such that they can be caused to conduct during either polarity of the AC source so as to effect desired current flow through the primary winding assemblies 14*a* of the transformer.

The switch assemblies 16*a*, 16*b*, 16*c*, and 16*d* preferably comprise either silicon control rectifiers, isolated gate bipolar transistors, metal oxide semiconductor field effect transistors, or metal oxide semiconductor controlled thyristors. Those skilled in the art will appreciate that various other switching devices are likewise suitable. Transistor switches 18*a*, 18*b*, 18*c*, and 18*d*, control operation of the switch assemblies 16*a*, 16*b*, 16*c*, and 16*d*.

For example, applying signal to PWM_DRIVE 24*a* allows current to flow through transistor switch 18*a* and return via PWM_RETURN 26*a*, thereby causing the switch 16*a* to conduct. Similarly, applying a signal to PWM_DRIVE 24*b*, PWM_DRIVE 24*c*, or PWM_DRIVE 24*d* causes respective transistor switch 18*b*, 18*c*, or 18*d* to actuate and thereby cause associated switch assembly 16*b*, 16*c*, or 16*d* to conduct.

Whenever PWM_DRIVE is applied to any diagonally opposed pair of transistor switches 18*a*, 18*b*, or 18*c*, 18*d*, then its inverted corresponding signal is applied to the opposite pair of transistor switches 18*c*, 18*d*, or 18*a*, 18*b* such that only diagonally opposed switch assemblies 16*a*, 16*b* or 16*c*, 16*d* are actuated simultaneously.

It is important to note that the actuation of switch assembly 16*a* simultaneously with switch assembly 16*d* or the actuation of switch assembly 16*c* simultaneously with switch assembly 16*b* would short circuit the AC source, thereby likely damaging the switches and also interrupting, possibly for a long period of time, power to the load.

In order assure that the switches do not conduct simultaneously, no signal is applied for a period of time to any switch in between in the application of the PWM_DRIVE signal to any switch. That is, an underlap between subsequent applications of the PWM_DRIVE signal is provided to assure that the PWM_DRIVE signal is not applied to switches simultaneously in a manner which would short circuit the voltage source. This underlap is shown graphically in the timing diagram of FIG. 3.

Inductor 20 is in series with the primary winding 14*a* of the transformer and functions as a current integrator to effectively sum currents in opposite directions together into a single current in a single direction during any given cycle period, so as to define a generally sinusoidal current waveform through the primary winding 14*a* of the transformer.

Capacitor 22 functions as a high pass filter so as to remove a high frequency component of the drive current from the primary winding 14*a* of the transformer.

According to the present invention a predetermined time interval, which is much less than the period of the AC voltage source, preferably less than 0.001 seconds, preferably approximately 0.00005 seconds, defines a cycle period during which one or both diagonally opposed switch assemblies 16*a*, 16*b* or 16*c*, 16*d* conduct. Thus, for a 100% cycle period switch assemblies 16*a*, 16*b*, for example, conduct for a maximum amount of time and switch assemblies 16*c*, 16*d* do not conduct at all. For a 0% cycle period, switch assemblies 16*a*, 16*b* do not conduct at all and switch assemblies 16*c*, 16*d* conduct for the maximum amount of time.

According to the preferred embodiment of the present invention, no switch conducts for 100% of the cycle period since an underlap is provided between the energizing of switches so as to prevent switch assemblies 16*a*, 16*b* or switch assemblies 16*c*, 16*d* from being energized simultaneously.

Thus, during each predetermined time interval, one pair of switch assemblies 16*a*, 16*b* or 16*c*, 16*d* conducts so as to cause current to tend to flow through transformer primary 14*a*. During the remainder of the predetermined time interval the opposite switch assemblies 16*c*, 16*d* or 16*a*, 16*b* conduct so as to cause current to tend to flow in the opposite direction through the primary winding 14*a* of the transformer.

Thus, during each predetermined time interval current flows through the primary winding 14*a* of the transformer in an amount proportional to the cycle period.

Referring now to FIG. 2, the AC output of the regulator is applied to a signal conditioner, rectifier and filter 50 which provides a DC output to a set point comparitor and error integrator 52.

The set point comparitor compares the DC signal which is representative of the AC output of the regulator to a reference voltage and generates an error signal proportional to the difference between the AC output of the regulator and the reference voltage integrated over time and provides the error signal to pulse width modulator 54 so that the pulse width modulator 54 can provide the PWM _DRIVE signal and its inverse to the switch assemblies 16*a*, 16*b*, 16*c*, and 16*d* utilizing cycle periods which effect the generation of the desired regulated output voltage, as discussed above.

Having discussed the structure of the present invention, it is beneficial to discuss the operation and use thereof. An exemplary use of the present invention would be in a lighting control system. If, for example, 110 volts AC is applied to the AC source line input 10*a* and a fluorescent lighting system, comprising 3*a* plurality of fluorescent lights, is connected to the load output 12*a*, then the AC voltage regulator of the present invention may be utilized to provide a higher voltage to the fluorescent lights during start-up thereof, when such higher voltage is required to properly initiate the fluorescent lights. Then, the voltage may be lowered substantially so as to result in more efficient operation of the fluorescent lights after initiation thereof. Indeed, the voltage may be varied to different levels within the operational voltages of the fluorescent lights, so as to effect a desired lighting level.

If it is assumed that a 100% cycle period is necessary to initiate the fluorescent lights and that a 60% cycle period provides efficient operation thereof after initiation, then the PWM_DRIVE signal is applied first to switch assemblies 16*a*, 16*b* and subsequently to switch assemblies 16*c*, 16*d*, according to predetermined time interval A of FIG. 3.

That is, once the fluorescent lights have initiated, the voltage provided thereto is reduced to 60% times the step-down ratio, which is 60% times 10%, thus resulting in a 6% decrease of the line voltage (which is 94% of nominal), for example. Thus, for efficient operation of the fluorescent lights, the PWM_DRIVE signal is provided according to predetermined time interval C of FIG. 3. Such operation of the AC voltage regulator may continue until manually modified, by either increasing or decreasing the intensity of the fluorescent lights by changing the reference voltage provided to the set point comparitor and error integrator 52 of FIG. 2. This may be done by utilizing a wall dimmer switch, for example. Turning the wall dimmer switch would change the reference voltage, thereby changing the cycle period and thus increasing or decreasing the brightness of the lights.

It is understood that the exemplary voltage regulator of the present invention described herein and shown in the drawings represents only a presently preferred embodiment of the invention. Indeed, various modifications and additions may be made to such embodiment without departing from the spirit and scope of the invention. For example, various means for providing the PWM_DRIVE signal are contemplated. Those skilled in the art will appreciate the various different digital circuits may be utilized to provide pulses having the desired amplitude and duration. Also, various different types of switch assemblies 16*a*, 16*b*, 16*c*, and 16*d* may be utilized to control current flow through the primary winding 14*a* of the transformer. Thus, these and other modifications and additions may be obvious to those skilled in the art and may be implemented to adapt the present invention for use in a variety of different applications.

Referring now to FIG. 3, a timing diagram shows the PWM_DRIVE signal and its inverse. Three predetermined time intervals, each of equal length, preferably approximately 0.00005 seconds in length, are shown, each having a different cycle period.

Predetermined time interval A shows a 90% cycle period wherein PWM_DRIVE is in a high state for 90% of the interval and its inverse is low for the entire interval period.

Predetermined time interval B shows a 0% cycle period wherein PWM_DRIVE is in a low state for the entire predetermined time interval and its inverse is in a high state for the entire interval, except for the underlap portion which insures that switch assemblies 16*a*, 16*d* or 16*c*, 16*b* do not actuate simultaneously. As discussed above, only switch assemblies 16*a* and 16*b* or switch assemblies 16*c* and 16*d* are permitted to conduct simultaneously.

Predetermined time interval C shows a 60% cycle period wherein PWM_DRIVE is in a high state for 60% of the predetermined time interval and its inverse transitions from a low to a high state after the underlap.

It is understood that the exemplary AC voltage regulator of the present invention, which is described herein and shown in the drawings, represents only a presently preferred embodiment of the invention. Indeed, various modifications and additions may be made to such embodiment without departing from the spirit and scope of the present invention. For example, those skilled in the art will appreciate that various different types of switches or switching circuits may be utilized to effect control of the amount of current and the direction thereof through the primary winding of the transformer. Furthermore, various different types of circuits may be utilized to effect control of such switches. Thus, these and other modifications and additions may be obvious to those skilled in the art and may be implemented to adapt the present invention for use in a variety of different applications.

What is claimed is:

1. An AC voltage regulator for providing a desired AC voltage to a load, the desired AC voltage being within a predetermined range above and below that of an AC voltage source, the AC voltage regulator comprising:

a) a transformer having a primary winding and a secondary winding, the secondary winding configured to be placed in series between the AC voltage source and the load and whereby a ratio of number of turns in the primary winding to number of turns in the secondary winding defines said predetermined range;

b) a plurality of switches configured to direct current from the AC voltage source through the primary winding of the transformer, the switches being further configured to control the direction in which current flows through the primary winding of the transformer; and c) a circuit for controlling the switches such that current is caused to flow through the primary coil of the transformer in a manner which provides the desired voltage across the load.

2. The AC voltage regulator as recited in claim 1, wherein the plurality of switches comprises four switches.

3. The AC voltage regulator as recited in claim 1, wherein the plurality of switches comprises two switches in series with the primary winding of the transformer and the AC voltage source for controlling current through the primary winding in a first direction and two switches in series with the primary winding of the transformer and the AC voltage source for controlling current through the primary winding of the transformer in a second direction.

4. The AC voltage regulator as recited in claim 1, wherein the switches comprise devices selected from the list consisting of:

a) silicon control rectifiers;

b) isolated gate bipolar transistors;

c) metal oxide semiconductor field effect transistors; and d) metal oxide semiconductor control thyristors.

5. The AC voltage regulator as recited in claim 1, wherein the circuit for controlling the switches comprises a pulse width modulator.

6. The AC voltage regulator as recited in claim 1, wherein the circuit for controlling the switches comprises a pulse width modulator configured to cause a first pair of switches to conduct while simultaneously causing a second pair of switches not to conduct, then causing the second pair of switches to conduct while simultaneously causing the first pair of switches not to conduct.

7. The AC voltage regulator as recited in claim 1, wherein the circuit for controlling the switches comprises a pulse width modulator configured to define a cycle period which is less than a period of the AC voltage source, the pulse width modulator being configured to cause a first pair of switches to conduct so as to tend to cause current to flow in a first direction through the primary winding of the transformer during a first portion of the cycle period and to cause a second pair of switches to conduct so as to tend to cause current to flow in a second direction through the primary winding of the transformer during a second portion of the cycle period.

8. The AC voltage regulator as recited in claim 1, wherein the circuit for controlling the switches comprises a pulse width modulator configured to define a cycle period which has a length less than approximately 0.0001 seconds, the pulse width modulator being configured to cause a first pair of switches to conduct so as to tend to cause current to flow in a first direction through the primary winding of the transformer during a first portion of the cycle period and to cause a second pair of switches to conduct so as to tend to cause current to flow in a second direction through the primary winding of the transformer during a second portion of the cycle period.

9. The AC voltage regulator as recited in claim 1, wherein the circuit for controlling the switches comprises a pulse width modulator configured to define a cycle period which is approximately 0.00005 seconds long, the pulse width modulator being configured to cause a first pair of switches to conduct so as to tend to cause current to flow in a first direction through the primary winding of the transformer during a first portion of the cycle period and to cause a second pair of switches to conduct so as to tend to current to flow in a second direction through the primary winding of the transformer during a second portion of the cycle period.

10. The AC voltage regulator as recited in claim 1, further comprising an integrator for integrating current flow through the primary winding of the transformer.

11. The AC voltage regulator as recited in claim 1, further comprising an inductor in series with the primary winding of the transformer for mitigating variation in current flow therethrough.

12. The AC voltage regulator as recited in claim 1, wherein a ratio of turns of the primary winding of the transformer to turns of the secondary winding of the transformer is approximately 10 to 1, so as to provide voltage regulation from approximately 90% of the voltage of the AC voltage source to approximately 110% of the voltage of the AC voltage source.

13. A method for providing a desired AC voltage to a load, the desired AC voltage being within a predetermined range above and below that of an AC voltage source, the method comprising the steps of:

a) defining a cycle period having a period less than a period of the AC source;

b) switching a voltage applied to a current integrator and a primary winding of a transformer to have a first polarity for a first portion of the cycle period and switching the voltage applied to the current integrator and the primary winding of the transformer to have a second polarity for a second portion of the cycle period;

c) the current integrator facilitating a generally sinusoidal current flow through the primary winding of the transformer; and d) the primary winding of the transformer inducing a voltage into a secondary winding of the transformer, the induced voltage changing a voltage from the AC voltage source to a desired AC voltage, whereby a ratio of number of turns in the primary winding to number of turns in the secondary winding defines said predetermined range.

14. The method as recited in claim 13, wherein the step of defining a cycle period comprises defining a cycle period having a period of less than approximately 0.0001 second.

15. The method as recited in claim 13, wherein the step of defining a cycle period comprises defining a cycle period of approximately 0.00005 second.

16. The method as recited in claim 13, wherein the step of switching a voltage applied to the current integrator and the primary winding of the transformer comprises switching a voltage applied to an inductor and the primary winding of the transformer.

17. The method as recited in claim 13, wherein the step of switching comprises alternately causing a first pair of switches to conduct so as to tend to cause current to flow through the primary winding of the transformer in a first direction and causing a second pair of switches to conduct so as to tend to cause current flow through the primary winding of the transformer in a second direction.

18. The method as recited in claim 13, wherein the step of switching comprises alternately causing a first pair of switches to conduct so as to tend to cause current to flow through the primary winding of the transformer in a first direction and causing a second pair of switches to conduct so as to tend to cause current flow through the primary winding of the transformer in a second direction, the first and second pairs of switches not conducting simultaneously.

19. The method as recited in claim 13, wherein the step of switching comprises the steps of:

a) alternately causing a first pair of switches to conduct so as to tend to cause current to flow through the primary winding of the transformer in a first direction and causing a second pair of switches to conduct so as to tend to cause current flow through the primary winding of the transformer in a second direction; and b) causing neither the first pair of switches nor the second pair of switches to conduct for a predetermined time interval prior to causing either the first pair of switches or the second pair of switches to conduct.

20. The method as recited in claim 13, wherein the step of the primary winding of the transformer inducing a voltage into a secondary winding of the transformer comprises inducing the voltage via a transformer having a ten to one ratio of turns of the primary winding to the secondary winding.

* * * * *